Jan. 18, 1949.  J. F. MELICHAR  2,459,668
VALVE CASING
Filed May 11, 1944
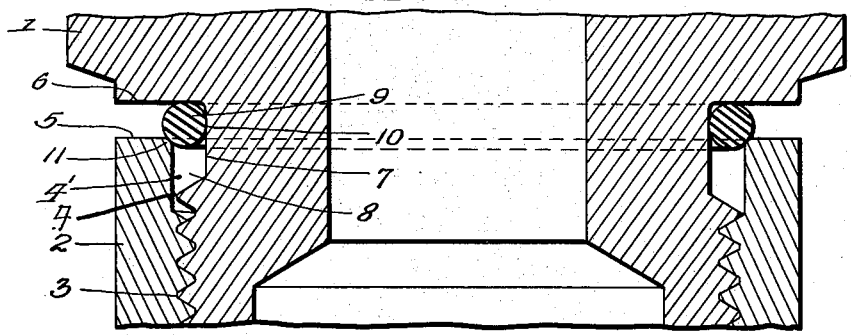
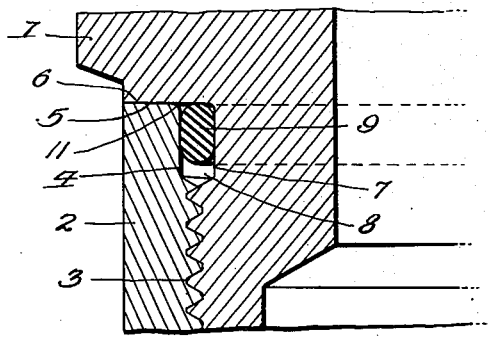
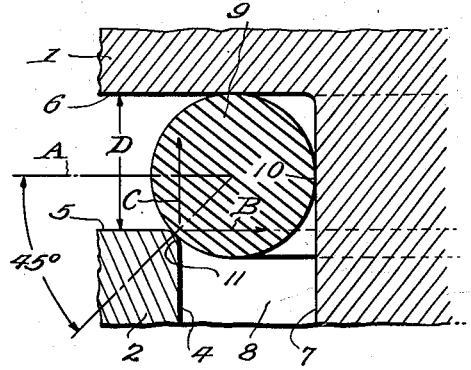
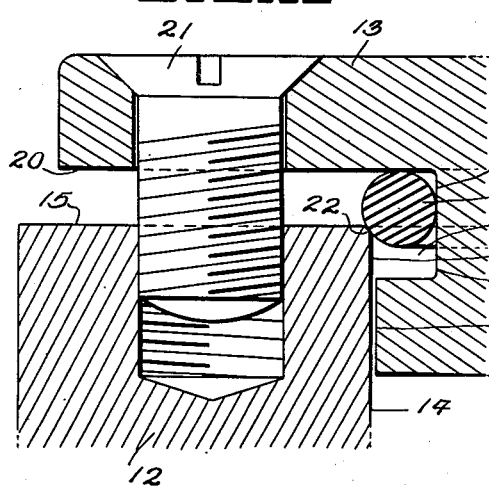
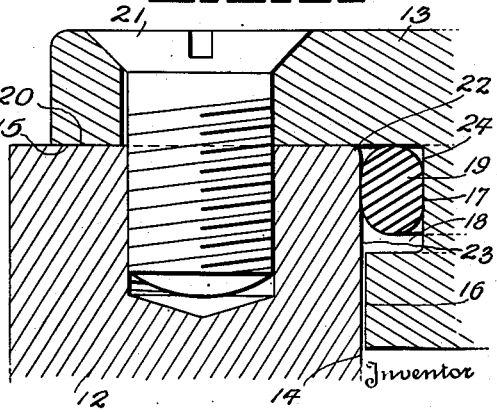
Inventor
Joseph F. Melichar
By Mason, Porter & Weller
Attorneys Patented Jan. 18, 1949

2,459,668

UNITED STATES PATENT OFFICE 2,459,668

VALVE CASING

Joseph F. Melichar, Cleveland, Ohio, assignor to The Parker Appliance Company, Cleveland, Ohio, a corporation of Ohio Application May 11, 1944, Serial No. 535,119

1 Claim. (Cl. 285—55)

The invention relates to new and useful improvements in a valve casing and more particularly the means for connecting parts thereof so as to seal the joint therebetween.

An object of the invention is to provide a connection between parts of a valve casing wherein the parts when joined form a gasket chamber in which may be placed an elastic gasket so dimensioned relative to the chamber as to seal the joint solely by the expansion of the gasket.

A further object of the invention is to provide a connecting means for parts of a valve casing wherein the parts make metal to metal contact and form therebetween an annular gasket chamber for an elastic gasket which is so dimensioned relative to the chamber as to seal the joint solely by the expansion of the gasket.

These and other objects will in part be obvious and will in part hereinafter be more fully described.

In the drawings:

Figure 1 is a sectional view through a portion of a valve casing showing sections thereof joined by the improved connecting means with the parts in an initial assembled position;

Figure 2 is a view similar to Figure 1 showing the parts fixedly connected together and the gasket in sealing relation to the joint between the parts;

Figure 3 is a diagrammatic view showing the dimensioning of the gasket relative to the annular chamber in which it is to be housed;

Figure 4 is a view showing another form of valve casing parts connected and sealed by the improved movements, the parts being in the initial assembled position; and Figure 5 is a view similar to Figure 4 but showing the parts fixedly joined and the gasket in sealing relation to the walls of the chamber in which it is housed.

The invention has to do with a means for connecting parts of a valve chamber so as to seal the joint therebetween. As shown in Figures 1 and 2, the invention is embodied in a valve casing having a body part 1 which is joined to a body part 2. These parts telescope one within the other and they have a threaded connection therebetween indicated at 3. The outer telescoping part 2 has a counter bore 4 which, as shown, is substantially the depth of the threads of said part. The end 5 of this outer telescoping part is a flat face and lies in a plane at right angles to the longitudinal axis of the valve casing. It is understood that the valve casing is cylindrical and therefore the wall of the bore 4 is an annular wall. The inner telescoping part 1 has a flat face 6 which is parallel with the flat face of the outer telescoping section 5 and when the parts of the valve casing are joined in fixed relation to each other there is a metal to metal contact between these smooth surfaces 5 and 6.

The inner telescoping part 1 also has a cutaway portion between the flat face 6 and the threaded section, the inner wall 7 of which is cylindrical and concentric with the axis of the valve casing. This forms a chamber 8 which is annular and when the parts are fixedly connected with the smooth surfaces 5 and 6 in contact, the chamber is a closed chamber. This chamber formed by the connecting of the parts serves as a housing for an elastic gasket 9. Said gasket is annular and preferably circular in a radial cross section. In Figure 3 there is shown diagrammatically the dimensioning of the gasket, when free from compressing forces relative to the distance between the inner and outer annular walls 4' and 7 of the gasket chamber 8. The gasket is so dimensioned that the cylindrical portion 7 of the inner telescoping section of the casing is .020" larger in diameter than the normal inside diameter of the ring gasket. When the ring gasket is positioned on this part there will be an initial seal between the point 10 and the wall of the chamber. The ring gasket is also so dimensioned as to project approximately .010" radially beyond the wall 4' of the chamber when the parts are initially assembled as shown in Figures 1 and 3. The corner 11 where the walls 4' and 5 join is slightly rounded or burnished. Referring again to Figure 3, it will be noted that the point of contact with this corner is substantially 45° from the radial line A. The radial component B of the force C closing up the gap D is at least equal to or greater than C, thereby assuring that the elastic ring gasket will not be pinched between the surfaces 5 and 6. When the parts are threaded together to a tightly assembled position, the ring gasket is deformed to the generally elliptical shape shown in Figure 2. In other words, the gasket is forced bodily into the gasket chamber and deformed so as to contact with the side walls 4' and 7 of said gasket chamber. This permits the walls 5 and 6 to be moved into metal to metal contact. The longitudinal length of the gasket chamber is greater than the expanded diameter of the gasket, as shown in Figure 2. Therefore when the parts are in full assembled position, the joint between the parts is sealed solely by the expansion of the elastic gasket. When fluid pressure acts on the chamber 8 at the inner side of the gasket, even a tighter seal will be effected between the gasket and the walls 4' and 7. The gasket chamber being completely closed, extremely high pressures will not cause extrusion of the gasket as the faces 5 and 6 are in contact and the chamber completely closed at the outer end thereof.

In Figures 4 and 5 there is shown a slightly modified form of mechanical connection between parts of a valve casing. The body of the valve is indicated at 12 and a closure cap therefor is indicated at 13. The body portion 12 is cylindrical and has an inner wall 14 which is concentric with the axis of the valve chamber. The outer end of the valve casing 15 is smooth and lies in a plane at right angles to the axis of the valve chamber. The closure cap 13 extends down into the valve casing with a comparatively loose fit, at 16. This downwardly extending part is recessed so as to provide an annular wall 17 which is spaced inwardly from the wall 16 and likewise inwardly from the wall 14 of the valve casing. This provides a chamber 18 for a gasket 19. The inner face 20 of the closure cap 13 makes contact with the outer end 15 of the valve casing when the parts are permanently assembled. The parts are held in assembled position by a plurality of screws 21 which extend through the closure cap and are threaded into the wall of the valve casing 12, as shown in Figure 5.

The gasket 19 is of elastic material, ring-shaped and circular in radial section. The gasket is dimensioned relative to the walls 14 and 17 of the gasket chamber 18 the same as described in connection with the gasket and gasket chamber shown in Figures 1 and 2. The corner 22 where the walls 14 and 15 join is rounded or burnished and contacts with the gasket on a radial line forming an angle of approximately 45° to a horizontal line centrally through the gasket. When the parts are forced into assembled position the gasket will be deformed and forced into the gasket chamber without being pinched between the surfaces 15 and 20. When it is in full assembled position the gasket is elliptical in shape and makes contact at the sides 23 and 24. The chamber 18 is of slightly greater longitudinal length than the deformed gasket and therefore the gasket seals the joint solely by the expansion of the gasket. Fluid pressure entering the chamber 18 will tend to expand the gasket into even tighter sealing contact with the walls 14 and 17.

It is obvious that the improved joint may be used with various parts of valve casings and other similar structures. It is essential that the parts be so constructed that when assembled a gasket chamber will be formed in the joint between the same, which gasket chamber is so dimensioned relative to an elastic ring gasket placed in the chamber, that the joint will be sealed solely by the expansion of the ring gasket.

I claim:

A fluid tight joint comprising a pair of interengaging parts having an annular gasket chamber therebetween, said gasket chamber comprising an outer cylindrical wall portion adjacent an end of one of said parts, an inner cylindrical wall portion in the other of said parts spaced from and parallel to said outer wall and a smooth end wall integral with said inner wall and extending radially outward from said inner wall beyond the outer wall and serving to completely close said chamber when the parts are connected with said end wall in firm metal to metal engagement with the end of the first named part, an elastic ring gasket in said chamber, said gasket and said chamber being dimensioned so that the distance between the inner and outer walls is less than the normal radial section of the gasket whereby the gasket when enclosed in said chamber will solely by its own expanding force be held in tight contact with said inner and outer walls of the chamber and whereby liquid entering the inner end of the chamber will force the gasket bodily into contact with the outer end wall of the gasket chamber, thereby causing the gasket to be further expanded laterally into tighter sealing contact with the inner and outer walls of the chamber.

JOSEPH F. MELICHAR.

REFERENCES CITED

The following references are of record in the file of this patent:

UNITED STATES PATENTS

| Number | Name | Date |
| --- | --- | --- |
| 794,539 | O'Brien | July 11, 1905 |
| 1,859,436 | Durdin | May 24, 1932 |
| 2,110,825 | Archer | Mar. 8, 1938 |
| 2,115,383 | Christensen | Apr. 26, 1938 |
| 2,150,221 | Hinderliter | Mar. 14, 1939 |
| 2,343,235 | Bashark | Feb. 29, 1944 |